(12) United States Patent
Kagaya

(10) Patent No.: US 8,615,716 B2
(45) Date of Patent: Dec. 24, 2013

(54) CONTENT DISPLAY CONTROL APPARATUS AND CONTENT DISPLAY CONTROL METHOD

(75) Inventor: Naoto Kagaya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1124 days.

(21) Appl. No.: 12/107,677

(22) Filed: Apr. 22, 2008

(65) Prior Publication Data

US 2008/0282190 A1   Nov. 13, 2008

(30) Foreign Application Priority Data

May 7, 2007   (JP) ................................. 2007-122800

(51) Int. Cl.
*G06F 3/0484* (2013.01)
*G06F 3/04817* (2013.01)

(52) U.S. Cl.
USPC ........... 715/766; 715/765; 715/835; 715/838; 715/853

(58) Field of Classification Search
USPC .......................... 715/766, 765, 835, 838, 853
See application file for complete search history.

(56) References Cited

U.S. PATENT DOCUMENTS

| | | | |
|---|---|---|---|
| 6,012,069 A | 1/2000 | Shibazaki | 707/104 |
| 7,668,789 B1 * | 2/2010 | Forman et al. | 706/20 |
| 7,703,043 B2 | 4/2010 | Utsuki et al. | |
| 2002/0099694 A1 * | 7/2002 | Diamond et al. | 707/3 |
| 2003/0227468 A1 | 12/2003 | Takeda | 345/619 |
| 2005/0177568 A1 * | 8/2005 | Diamond et al. | 707/5 |
| 2006/0020969 A1 | 1/2006 | Utsuki et al. | |

FOREIGN PATENT DOCUMENTS

| | | |
|---|---|---|
| JP | 10-275161 | 10/1998 |
| JP | 2004-013575 | 1/2004 |
| JP | 2004-139401 | 5/2004 |
| JP | 2006033094 A | 2/2006 |

OTHER PUBLICATIONS

Office Action dated Apr. 20, 2012 in corresponding Japanese Patent Application No. 2007-122800.

* cited by examiner

*Primary Examiner* — Namitha Pillai
(74) *Attorney, Agent, or Firm* — Fitzpatrick, Cella, Harper & Scinto

(57) ABSTRACT

Content items that have the same metadata are grouped together as content groups out of content items to which metadata of different categories has been added, and a content group having a previously selected category and metadata thereof is taken as a criterion. The arrangement of the content groups that have been grouped together is determined based on the relevance between the metadata of another category in the content group serving as the criterion and the metadata of the other category in the content groups to be arranged. The determined arrangement of the content groups is displayed on a display apparatus.

9 Claims, 19 Drawing Sheets

FIG. 7

| CONTENT | EVENT | PEOPLE | LOCATION | ... |
|---|---|---|---|---|
| 411 | SOCCER | MR. A | TOKYO | |
| 412 | SOCCER | MR. B | TOKYO | |
| ... | ... | ... | ... | ... |
| 418 | SOCCER | MS. D | CHIBA | |
| 419 | SOCCER | MR. F | CHIBA | |
| 421 | FISHING | MR. A | SHIZUOKA | |
| 422 | FISHING | MR. B | SHIZUOKA | |
| ... | ... | ... | ... | ... |
| 426 | FISHING | MS. D | KANAGAWA | |
| 427 | FISHING | MR. F | KANAGAWA | |
| 431 | GOLF | MR. B | CHIBA | |
| 432 | GOLF | MS. D | CHIBA | |
| ... | ... | ... | ... | ... |
| 437 | GOLF | MR. E | SAITAMA | |
| 438 | GOLF | MR. G | SAITAMA | |
| 441 | CAMPING | MR. A | NAGANO | |
| 442 | CAMPING | MS. C | NAGANO | |
| ... | ... | ... | ... | ... |
| 444 | CAMPING | MR. E | NAGANO | |
| 445 | TENNIS | MR. A | CHIBA | |
| ... | ... | ... | ... | ... |

FIG. 8

| EVENT | PEOPLE | TOTAL | LOCATION | TOTAL |
|---|---|---|---|---|
| SOCCER | MR. A, MR. B, MS. D, MR. F | | TOKYO, CHIBA, KANAGAWA | |
| TENNIS | MR. A, MR. B, MR. G, MR. I | 2 | TOKYO, CHIBA, KANAGAWA | 3 |
| GOLF | MR. B, MS. D, MR. E, MR. G | 2 | CHIBA, SAITAMA | 1 |
| SOFTBALL | MR. B, MS. D, MR. F, MR. E | 3 | KANAGAWA | 1 |
| CAMPING | MR. A, MR. C, MS. E, MR. G | 1 | NAGANO | 0 |
| FISHING | MR. A, MR. B, MS. D, MR. F | 4 | SHIZUOKA, KANAGAWA | 1 |
| TRAVELING | MR. A, MR. B, MR. F, MR. G | 3 | NAGANO | 0 |
| CURLING | MR. A, MR. B, MS. D, MS. C | 3 | TOKYO, KANAGAWA | 2 |
| ... | ... | ... | ... | ... |

FIG. 9

| EVENT | PEOPLE | NUMBER OF CONTENT ITEMS | TOTAL |
|---|---|---|---|
| SOCCER | MR. A | 10 | |
| | MR. B | 18 | |
| | MS. D | 5 | |
| | MR. F | 7 | |
| TENNIS | MR. A | 8 | |
| | MR. B | 6 | |
| | MR. G | 20 | |
| | MR. I | 5 | 14 |
| GOLF | MR. B | 4 | |
| | MS. D | 15 | |
| | MR. E | 5 | |
| | MR. G | 3 | 9 |
| SOFTBALL | MR. B | 12 | |
| | MS. D | 10 | |
| | MR. F | 3 | |
| | MR. E | 7 | 25 |
| CAMPING | MR. A | 20 | |
| | MS. C | 1 | |
| | MR. E | 8 | |
| | MR. G | 11 | 20 |
| ... | ... | ... | ... |

F I G. 10

| CATEGORY | EVENT | PEOPLE | LOCATION | ... |
|---|---|---|---|---|
| 1 | SOCCER | MR. A | TOKYO | |
| 2 | TENNIS | MR. B | KANAGAWA | |
| 3 | GOLF | MS. C | CHIBA | |
| 4 | SOFTBALL | MS. D | SAITAMA | |
| 5 | CAMPING | MR. E | IBARAKI | |
| 6 | FISHING | MR. F | TOCHIGI | |
| 7 | TRAVELING | MR. G | GUNMA | |
| 8 | CURLING | MS. H | SHIZUOKA | |
| 9 | ... | MR. I | ... | |
| 10 | | ... | | |
| ... | | | | |

F I G. 11

| CATEGORY | PRIORITY 1 | PRIORITY 2 | PRIORITY 3 |
|---|---|---|---|
| EVENT | PEOPLE | LOCATION | ... |
| PEOPLE | EVENT | LOCATION | ... |
| LOCATION | PEOPLE | EVENT | ... |
| ... | ... | ... | ... |

CONTENT DISPLAY CONTROL APPARATUS AND CONTENT DISPLAY CONTROL METHOD

BACKGROUND OF THE INVENTION

1. Field of the Invention

The present invention relates to a content display control apparatus and a content display control method that arranges and displays a plurality of content items according to a given category.

2. Description of the Related Art

In recent years, in addition to PCs and dedicated storage apparatuses, cameras that capture content and the like are provided with a storage function, and some apparatuses store broadcast content, such as disc recorders. Accordingly, there are display apparatuses that display the content stored in these devices. Some of these display apparatuses in these configurations display a list of all the content as text, such as the content names.

Also, in recent years, methods for displaying a list are employed in which an overview of the content is displayed explicitly in the form of images or videos as thumbnails of content items or partial playback of characteristic portions. Such display methods display the content in various orders such as in the order of date or file name, whereby the overview of the content is shown in an easily viewable manner, so that they are effective in searching content.

Further, there is another method for providing an easy content search by organizing and grouping the content. In this case, the content groups formed by grouping the content are represented by icons. In many cases, the icon representing a content group is created using an image of a representative content item in the content group or a part of the image, or using images of all content items.

Under these circumstances, in order to provide an easy content search in displayed content, there is a method in which metadata of various categories is added to the content, and the content is arranged according to the order of the categories. Examples of such categories are date, people, location, event and the like.

As the method of arranging content according to each category, in the date category, the content is arranged in date order. In other categories, the content is arranged in alphabetical order, or in the order of the Japanese syllabary of the metadata, for example.

However, there is a demand to arrange related content items close together when the user attempts to search a desired content item by browsing the content. In other words, to display related content items close together is effective in a visual content search which is to search a certain content item while browsing the content.

Under these circumstances, a method has been proposed in which content is selected, a common keyword is extracted from the selected content, the relevance between the common keyword and the keyword assigned to the content is checked from a keyword table, and the content is arranged in descending order of relevance. For example, see Japanese Patent Laid-Open No. H10-275161.

Also, a system for sorting content has been proposed in which the images of content that is grouped together based on relevance information are displayed, and the images in each group are sorted based on existing order information or by inputting order information. For example, see Japanese Patent Laid-Open No. 2004-013575.

Further, a system has been proposed in which keywords assigned to content are classified using a dictionary, and the sorting order of the content is determined based on the importance of the keywords. For example, see Japanese Patent Laid-Open No. 2004-139401.

However, the conventional techniques described above have the following problems.

(1) In the case of grouping the content having the same metadata in a desired category before arranging and displaying to perform a visual content search, in order to arrange relevant content items close together, it cannot be determined which order of arranging the content groups is effective.

(2) In the case of sorting the content groups in date order or in the order of the Japanese syllabary, alphabet of the metadata or the like, relevant content items are not always arranged close together in the category.

(3) In the case of determining the order based on the stored tables containing the relevancy or importance of keywords, the content groups cannot be arranged properly according to the relevance between the content items stored in the system.

(4) In the case of sorting the content groups in descending order of relevance to content or a content group serving as a criterion, it cannot be determined which order is effective to arrange relevant content items close together.

SUMMARY OF THE INVENTION

According to one aspect of the present invention, there is provided a content display control method that is executed by a content display control apparatus that arranges and displays a plurality of content items, taking a given category as a criterion, the method comprising the steps of: grouping together as content groups those content items that have the same metadata out of content items to which metadata of different categories has been added; determining an arrangement of the content groups that have been grouped together, using a content group having a previously selected category and metadata thereof as a criterion; and displaying the determined arrangement of the content groups on a display apparatus, wherein in the determination step, the arrangement of the content groups that have been grouped together is determined based on the relevance between the metadata of another category in the content group serving as the criterion and the metadata of the other category in the content groups to be arranged.

According to another aspect of the present invention, there is provided a content display control apparatus that arranges and displays a plurality of content items, taking a given category as a criterion, the apparatus comprising: a means for grouping together as content groups those content items that have the same metadata out of content items to which metadata of different categories has been added; a means for determining an arrangement of the content groups that have been grouped together, using a content group having a previously selected category and metadata thereof as a criterion; and a means for displaying the determined arrangement of the content groups on a display apparatus, wherein the arrangement of the content groups that have been grouped together is determined based on the relevance between the metadata of another category in the content group serving as the criterion and the metadata of the other category in the content groups to be arranged.

Further features of the present invention will become apparent from the following description of exemplary embodiments with reference to the attached drawings.

BRIEF DESCRIPTION OF THE DRAWINGS

FIG. 7 is a diagram that shows the relationship between content and metadata according to an embodiment of the present invention.

FIG. 8 is a diagram that shows count results of overlapping metadata which overlap with those of content serving as a criterion.

FIG. 9 is a diagram that shows count results of the number of content items having metadata that overlap with those of content serving as a criterion.

FIG. 10 is a diagram that shows priority orders for metadata.

FIG. 11 is a diagram that shows priority orders for categories.

DESCRIPTION OF THE EMBODIMENTS

Hereinafter, the best mode for carrying out the invention will be described with reference to the drawings. It should be understood that this embodiment will be described in the context of a content search apparatus that sorts a plurality of image content items in the order of metadata category, and displays them. Firstly, the configuration of the entire system will be described.

[System Configuration]

Figure 1:
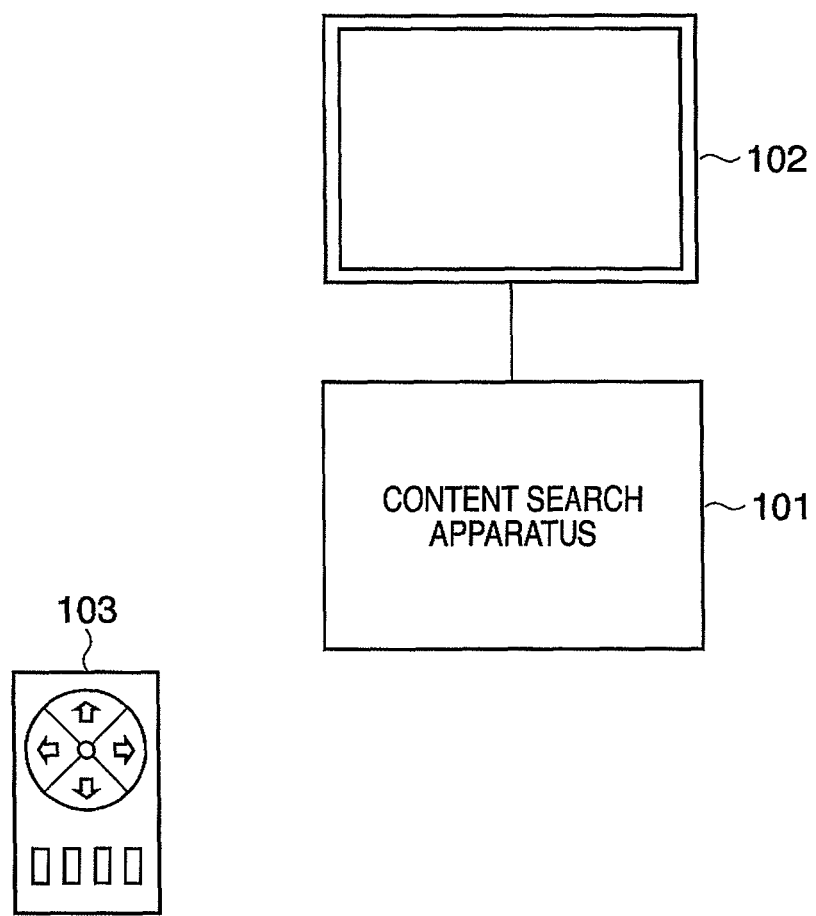
FIG. 1 is a diagram that shows an example of the configuration of a system assumed in an embodiment of the present invention.

FIG. 1 is a diagram that shows an example of the configuration of a system assumed in the present embodiment. In FIG. 1, reference numeral 101 denotes a content search apparatus that holds content and content group icons, forms an arrangement of the content group icons, and outputs the arrangement to a display apparatus 102. Reference numeral 102 denotes a display apparatus, such as a display, that has a function for displaying the images of the content and content group icons outputted from the content search apparatus 101. Reference numeral 103 denotes a remote controller that has an operation/input function such as selection of a content item or switching of a display.

Figure 2:
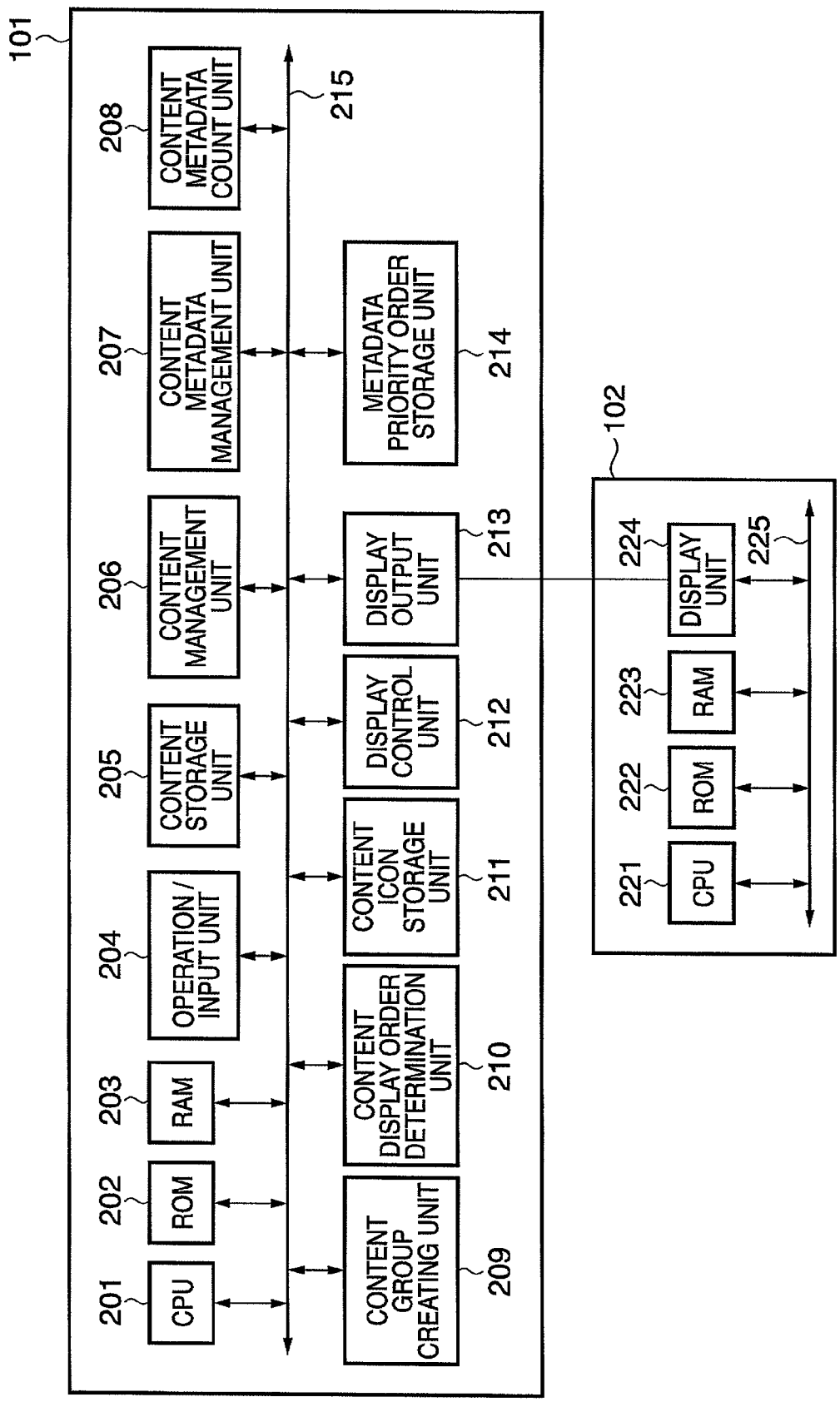
FIG. 2 is a diagram that shows the hardware configuration of a content search apparatus 101 and a display apparatus 102.

FIG. 2 is a diagram that shows the hardware configuration of the content search apparatus 101 and the display apparatus 102. In the content search apparatus 101 shown in FIG. 2, reference numeral 201 denotes a central processing unit (CPU), reference numeral 202 denotes a ROM, and reference numeral 203 denotes a RAM. Reference numeral 204 denotes an operation/input unit that receives operation commands from the remote controller 103.

Reference numeral 205 denotes a content storage unit, which is a memory that stores content to be displayed or searched. Reference numeral 206 denotes a content management unit that manages the content stored in the content storage unit 205. Reference numeral 207 denotes a content metadata management unit that manages metadata added to the content stored in the content storage unit 205.

FIG. 7 is a diagram that shows the relationship between content and metadata according to the present embodiment. As shown in FIG. 7, metadata refers to data that is added to each content item and that can be searched according to categories such as "event", "people" and "location". In the example shown in FIG. 7, for example, "soccer", "Mr. A", "Tokyo" and the like are metadata of different categories.

Referring back to FIG. 2, reference numeral 208 denotes a content metadata count unit that counts the number or the types of metadata that have been added to the stored content in each category. Specifically, as shown in FIGS. 8 and 9, the content metadata count unit 208 counts the number of people or location metadata that overlap with those of content serving as a criterion and the number of content items having metadata that overlap with those of the content serving as a criterion.

FIG. 8 is a diagram that shows count results of overlapping metadata which overlap with those of content serving as a criterion. In the example shown in FIG. 8, the content to which "soccer", which is event category metadata, has been added is content serving as the criterion (hereinafter referred to as "criterion content"). FIG. 8 shows what metadata have been added to the content having the same event category metadata in each event category, which are listed under categories of people and location.

FIG. 8 also shows the number of people category metadata that overlap with the people category metadata of the content to which the "soccer" metadata has been added for the content of each event category. It also shows the number of location category metadata that overlap with the location category metadata of the content to which the "soccer" metadata has been added in the content having other event category metadata.

For example, in the case of "tennis" metadata relative to the "soccer" serving as the criterion, there are two overlapping metadata, "Mr. A" and "Mr. B". In the case of "softball" metadata, there are three overlapping metadata, "Mr. B", "Ms. D", and "Mr. F".

FIG. 9 is a diagram that shows count results of the number of content items having metadata that overlap with those of the criterion content. In the example shown in FIG. 9, the content to which "soccer", which is event category metadata, has been added is the criterion content. FIG. 9 shows what metadata of people category have been added to the content groups having the same event category metadata in each event category.

FIG. 9 also shows the types of people category metadata of the content to which the "soccer" metadata serving as the criterion has been added, as well as the number of the content items. It also shows the number of content items having the same types of metadata as those of the content to which the "soccer" metadata has been added in the content having other event category metadata.

For example, in the case of the "tennis" metadata relative to "soccer" serving as the criterion, the overlapping metadata are "Mr. A" and "Mr. B", and the total number of the content items is 14. In the case of the "softball" metadata relative to "soccer" serving as the criterion, the overlapping metadata are "Mr. B", "Ms. D", and "Mr. F", and the total number of the content items is 25.

Now referring back to FIG. 2, reference numeral 209 denotes a content group creating unit that groups the content managed by the content management unit 206 based on the metadata that has been added to the content. Reference numeral 210 denotes a content display order determination unit that determines the order of the content to be displayed on the display apparatus 102 based on the data obtained by the content metadata count unit 208.

Reference numeral 211 denotes a content icon storage unit that stores content icons. Reference numeral 212 denotes a display control unit that arranges content group icons according to predetermined order conditions, and arranges the content group icons to create operation screen data.

Reference numeral 213 denotes a display output unit that outputs content, icons thereof, the operation screen data created by the display control unit 212, and the like to the display apparatus 102. Reference numeral 214 denotes a metadata priority order storage unit that stores priority orders of metadata. Specifically, the metadata priority order storage unit 214 stores priority orders for metadata as shown in FIG. 10, or priority orders for metadata categories as shown in FIG. 11, for example. Reference numeral 215 denotes an internal bus.

FIG. 10 is a diagram that shows priority orders for metadata. As can be seen from FIG. 10, the priority order of the event category is determined as follows: "soccer", "tennis", "golf", and so on. In the people category, the priority order is determined as follows: "Mr. A", "Mr. B", "Mr. C", and so on.

FIG. 11 is a diagram that shows priority orders for the categories. As shown in FIG. 11, the metadata category that comes after each selected criterion category is determined. For example, in the event category, the order is determined as "people", and then "location". In the people category, the order is determined as "event", and then "location". In this manner, the categories that are given priority are determined.

In the display apparatus 102 shown in FIG. 2, reference numeral 221 denotes a central processing unit (CPU), 222 denotes a ROM, and 223 denotes a RAM. Reference numeral 224 denotes a display unit that displays display image data generated by the display control unit 212 and outputted from the display output unit 213 of the content search apparatus 101. Reference numeral 225 denotes an internal bus.

Figure 3:
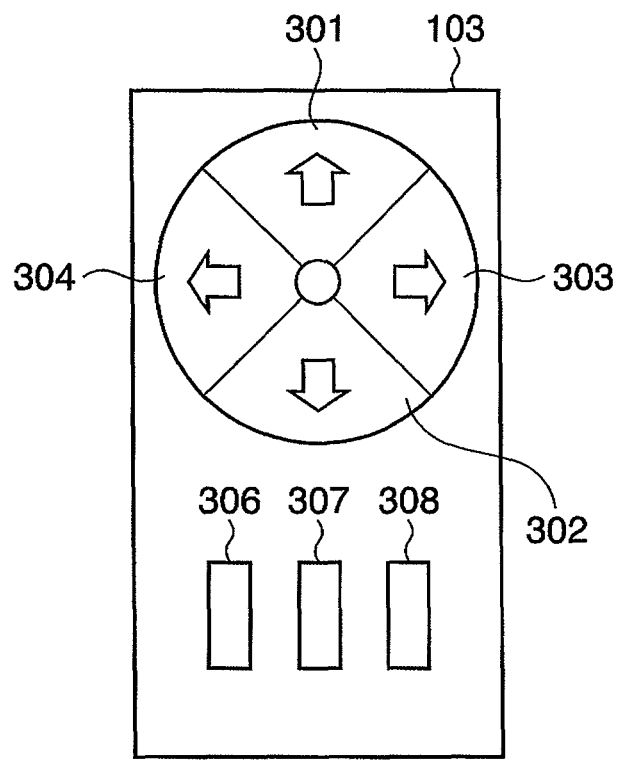
FIG. 3 is a diagram that shows the hardware configuration of a remote controller 103.

FIG. 3 is a diagram that shows the hardware configuration of a remote controller 103. In FIG. 3, reference numeral 301 denotes a key that issues an instruction of the upward direction, 302 denotes a key that issues an instruction of the downward direction, 303 denotes a key that issues an instruction of the rightward direction, and 304 denotes a key that issues an instruction of the leftward direction. These keys are operated to change the content icon selection or change the content selection.

Reference numeral 305 denotes an enter key that is depressed to enter a selection or operation. Reference numeral 306 denotes a metadata category determination operation key that is depressed to determine a metadata category serving as the criterion. Reference numeral 307 denotes a criterion content determination key that is depressed to determine content or a content group serving as the criterion. Reference numeral 308 denotes a screen switching key that is depressed to switch a content display screen to a content list display screen.

Display examples of content groups according to the present embodiment will now be described with reference to FIGS. 4 to 6. The examples of FIGS. 4 to 6 are shown with the criterion metadata category set to "event".

Figure 4:
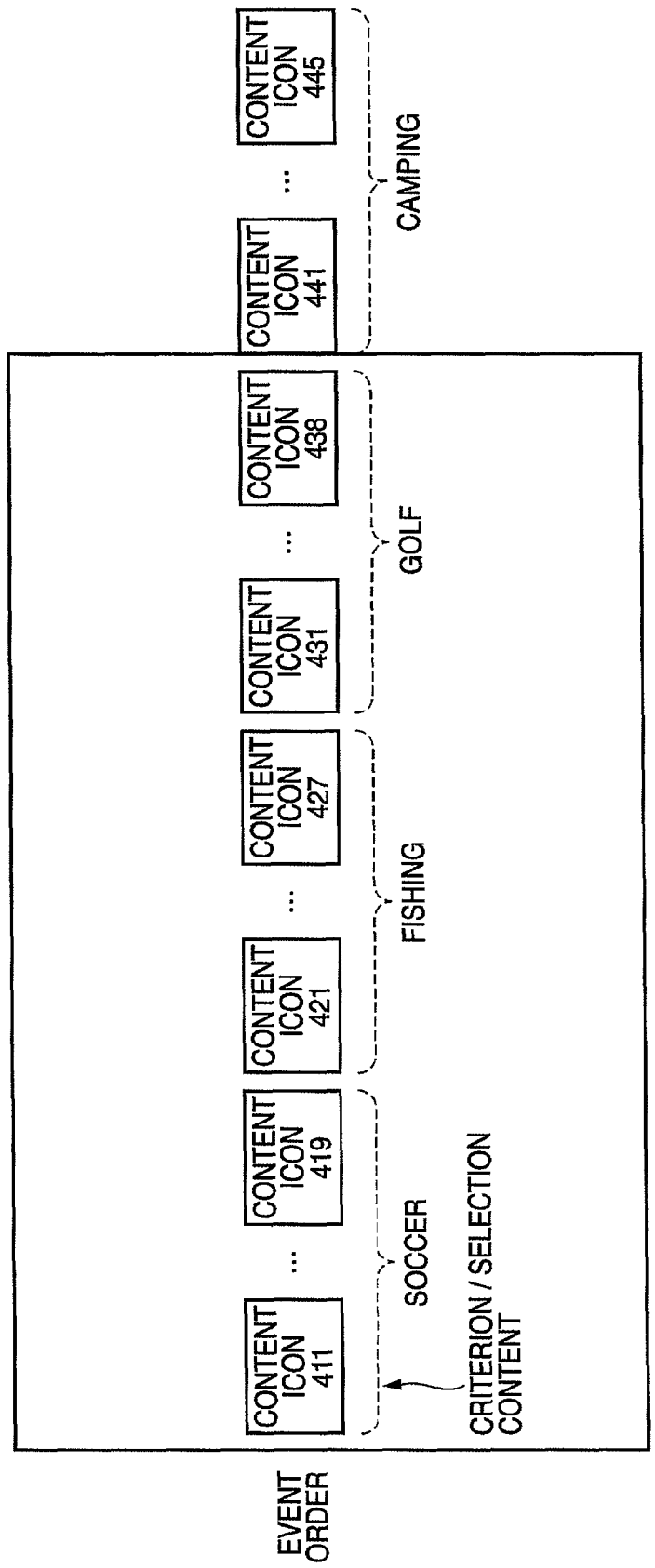
FIG. 4 is a diagram that shows a display example in which content icons 411 to 445 are arranged in a line.

FIG. 4 is a diagram that shows a display example in which content icons 411 to 445 are arranged in a line. As shown in FIG. 4, content having the same event metadata is arranged next to one another, and the content icons corresponding to the arranged content are displayed sequentially and grouped together by metadata. If a criterion/selection content is moved through the operation of the rightward and leftward direction instruction keys 303 and 304 of the remote controller 103, and the enter key 305 is depressed, the selected criterion/selection content is displayed. Also, if a given content icon is selected, and the criterion content determination key 307 is depressed, the order of the metadata groups changes.

Figure 5:
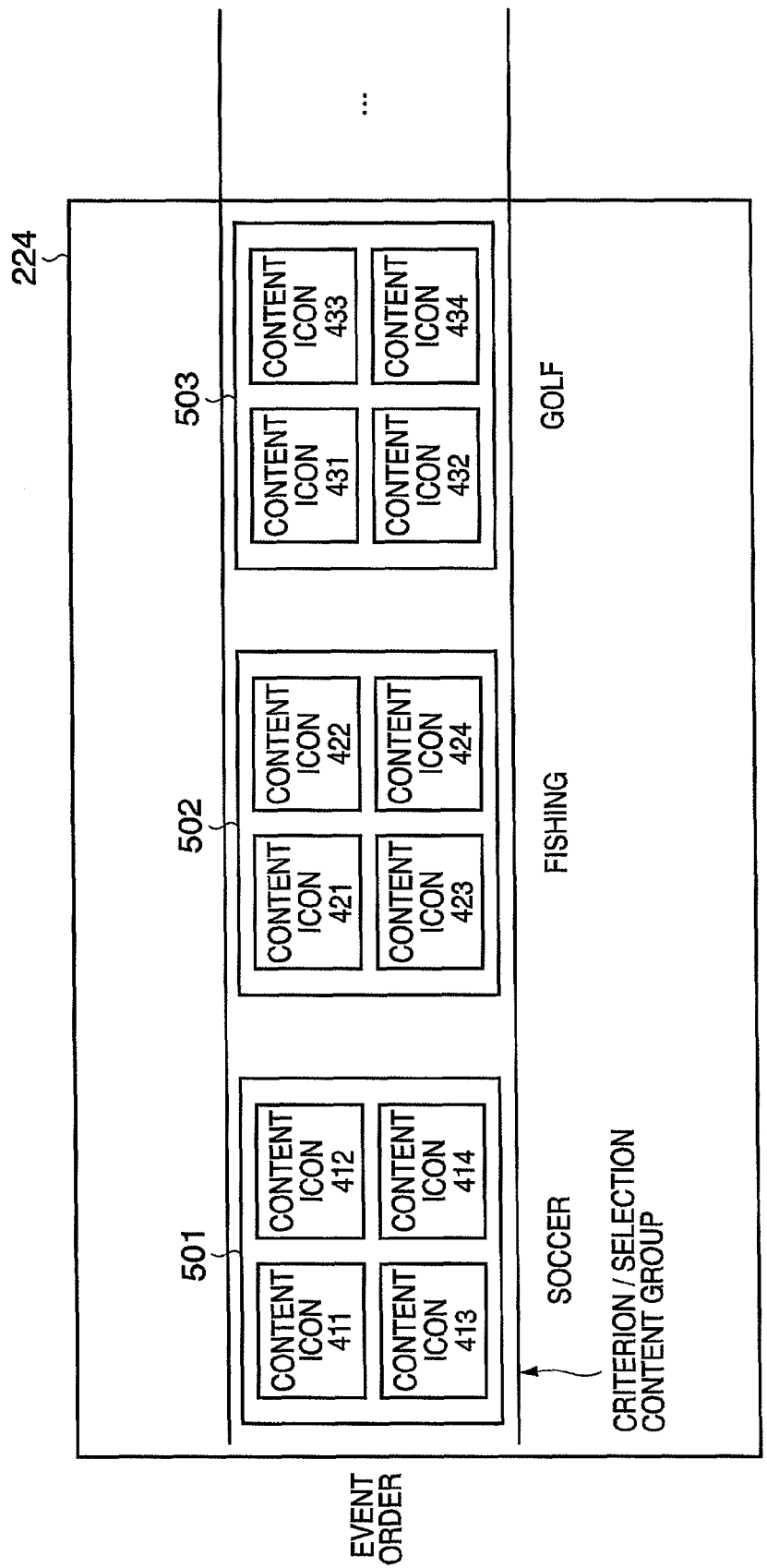
FIG. 5 is a diagram that shows a display example in which content group icons 501 to 503 are arranged in a line.

FIG. 5 is a diagram that shows a display example in which content group icons 501 to 503 are arranged in a line. As shown in FIG. 5, the content items having the same event metadata are grouped and arranged by the content group creating unit 209, and the formed groups of content icons are displayed sequentially and grouped together by metadata. If a criterion/selection content group is moved through the operation of the rightward and leftward direction instruction keys 303 and 304 of the remote controller 103, and the enter key 305 is depressed, the content included in the selected group is displayed as shown in FIG. 4. Also, if a given content group icon is selected, and the criterion content determination key 307 is depressed, the order of the content group icons changes.

Figure 6:
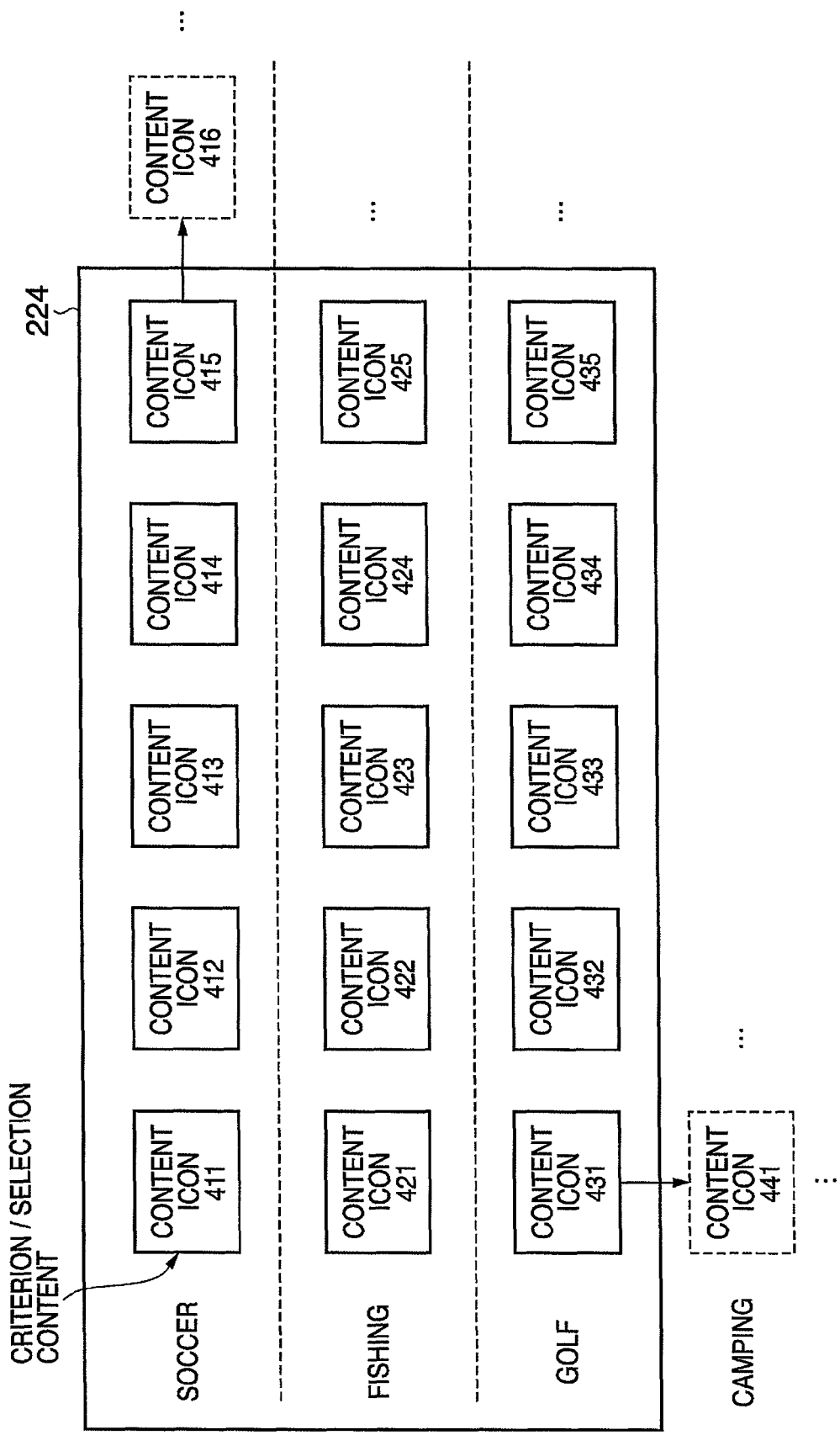
FIG. 6 is a diagram that shows a display example of content icons 411 to 441, where the content having the same event metadata is arranged laterally with the metadata groups being arranged vertically.

FIG. 6 a diagram that shows a display example of the content icons 411 to 441, where content having the same event metadata is arranged laterally with the metadata groups being arranged vertically. If a criterion/selection content is moved through the operation of the upward, downward, rightward and leftward direction instruction keys 301 and 304 of the remote controller 103, and the enter key 305 is depressed, the selected content is displayed. Also, if a given content is selected, and the criterion content determination key 307 is depressed, the order of the metadata groups that are arranged vertically changes.

[Detailed Description of Operation]

Next, a specific operation will be described for several cases. This embodiment will be described in the context of the criterion metadata category being set to "event".

Figure 12:
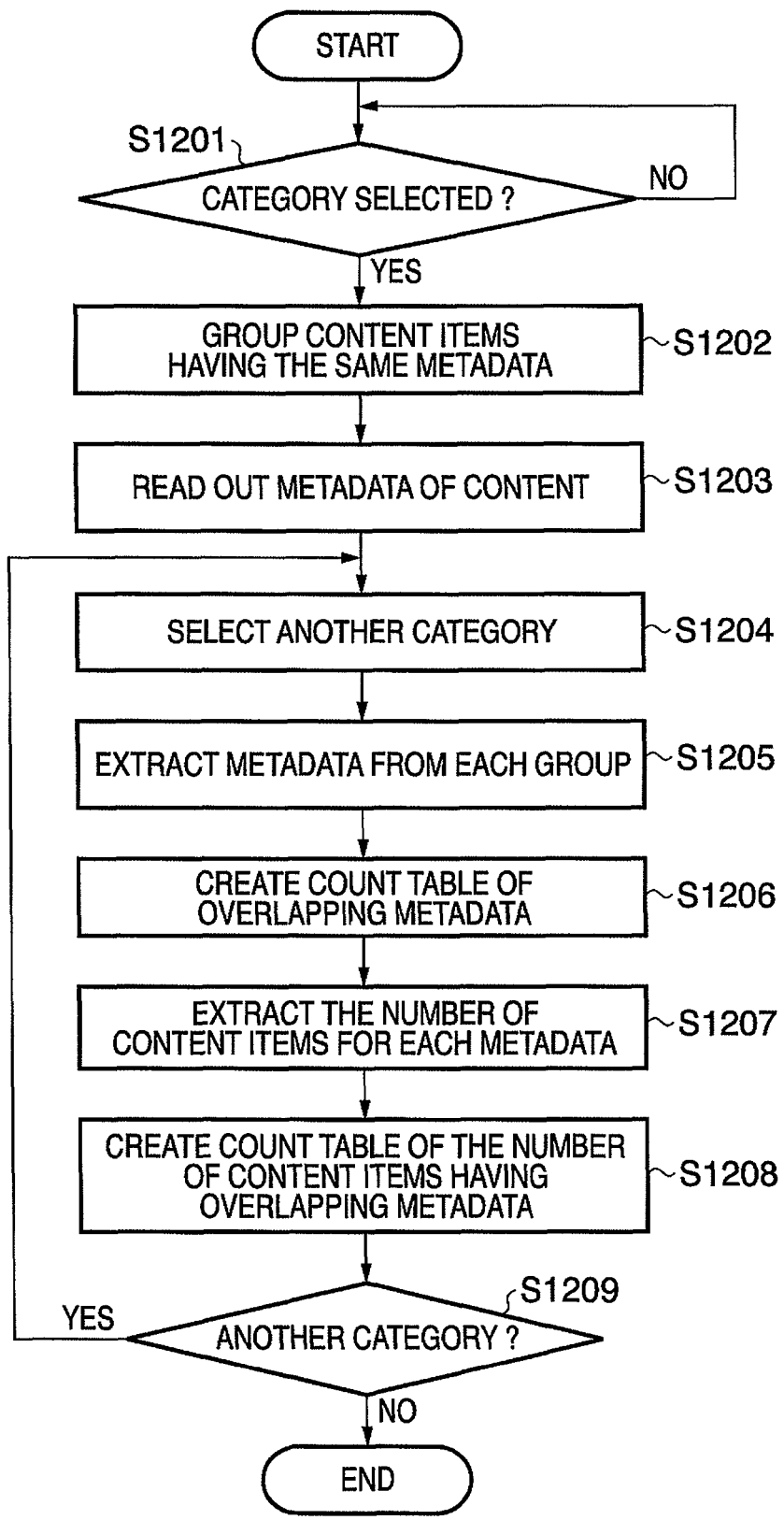
FIG. 12 is a flowchart that shows a process of counting the number of content items having overlapping metadata according to an embodiment of the present invention.

FIG. 12 is a flowchart that shows a process of counting the number of content items that have overlapping metadata according to the present embodiment. Firstly, in step S1201, the process waits for the user to select a metadata category, based on which groups to be displayed are created, through the remote controller 103. Upon selection, the process advances to step S1202. In step S1202, the content group creating unit 209 groups the content items having the same metadata in the selected category from the metadata managed by the content metadata management unit 207. Then, in step S1203, the metadata of each content item are read out.

Subsequently, in step S1204, one category is selected from the unselected categories. In step S1205, the content metadata count unit 208 extracts the metadata of the category from each group, and counts the overlapping metadata as shown in FIG. 8, in step S1206. Further, in step S1207, the content items having the extracted metadata are extracted from the group. In step S1208, the number of content items having the overlapping metadata is counted as shown in FIG. 9. Then, in step S1209, it is determined whether or not there is another metadata category. If there is another metadata category, the process returns to step S1204, and the above-described process is repeated.

In the manner described above, for all categories, the criterion for the order of arranging the content can be created. Further, by executing the above-described process in the background all the time, a suitable content arrangement criterion can be created dynamically.

[Arrangement Process 1]

Figure 13:
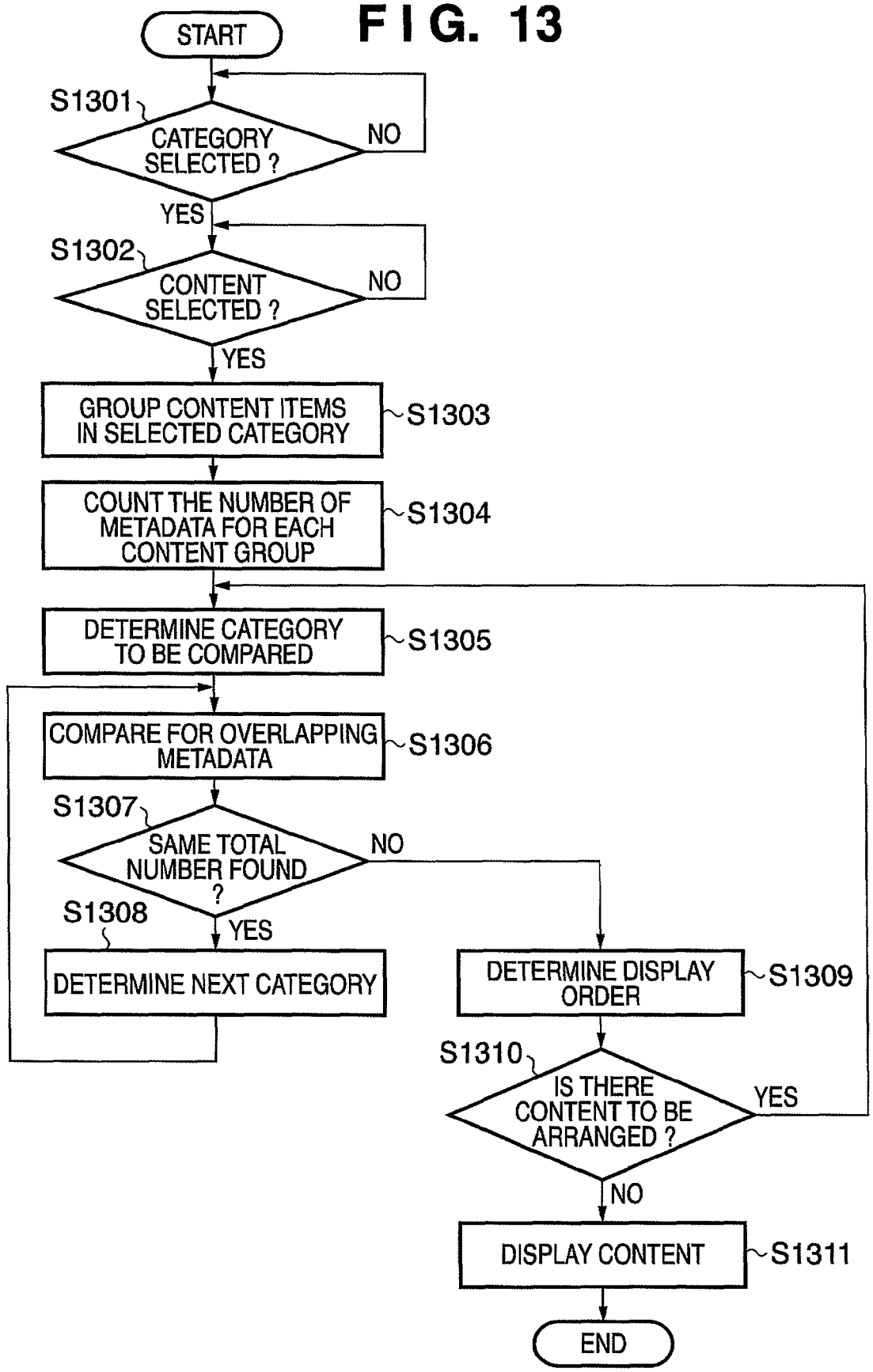
FIG. 13 is a flowchart that shows an arrangement process 1 according to an embodiment of the present invention.

FIG. 13 is a flowchart that shows an arrangement process 1 according to the present embodiment. The arrangement process 1 is performed, when the same total number of overlapping metadata is found in a given category, to determine a content arrangement based on the next higher category in the priority order.

Figure 14:
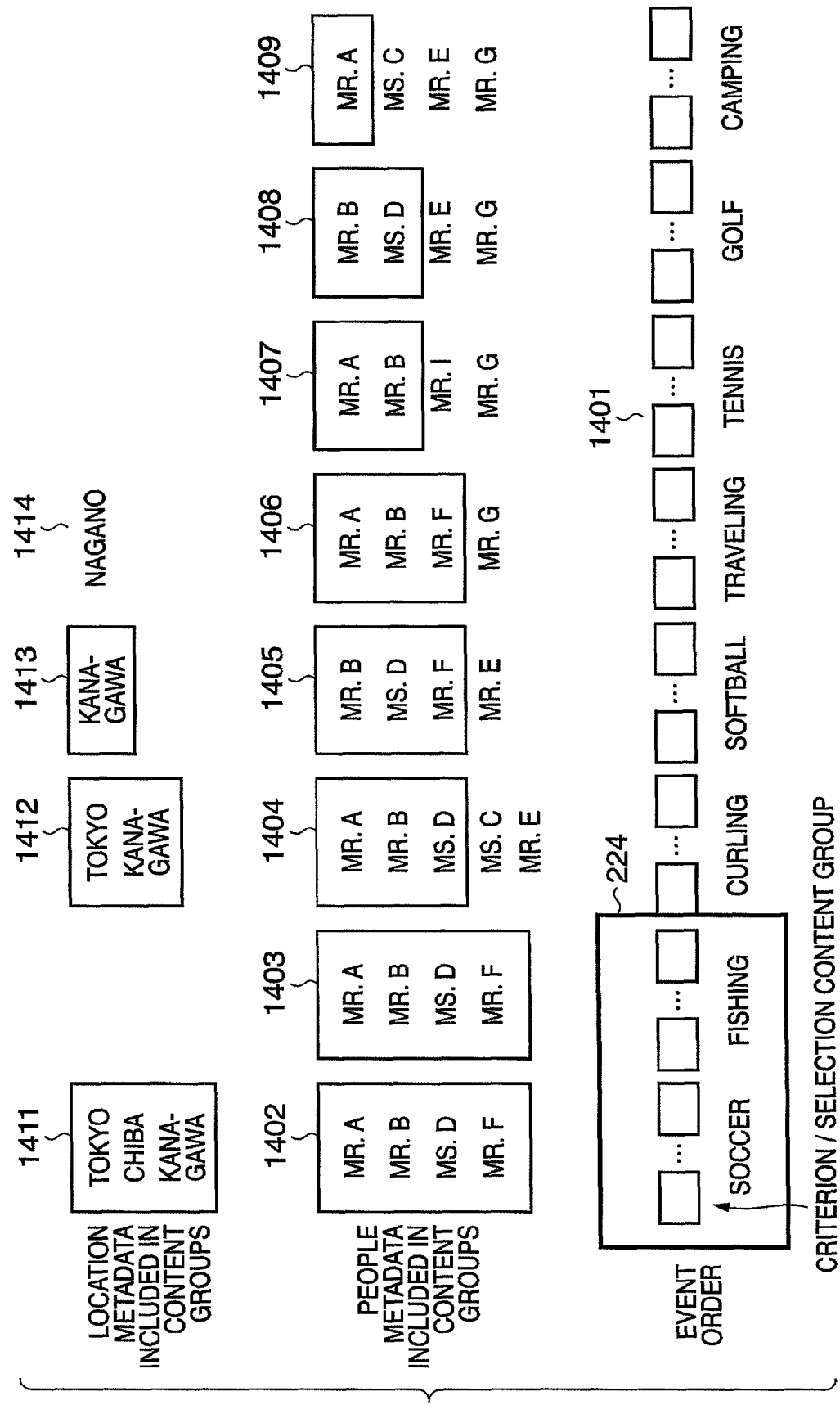
FIG. 14 is a diagram that shows a result of an arrangement process 1 according to an embodiment of the present invention.

FIG. 14 is a diagram that shows a result of the arrangement process 1 according to the present embodiment. In FIG. 14, reference numeral 1401 denotes a content arrangement, and a part thereof is displayed on the display unit 224. Reference numerals 1402 to 1409 denote metadata of the people category included in the content groups of the event category. Reference numeral 1402 denotes metadata of the people category included in the "soccer" group, and reference numeral 1403 denotes metadata of the people category included in the "fishing" group. Reference numerals 1411 to 1414 denote metadata of the location category included in the content groups of the event category. Reference numeral 1411 denotes metadata of the location category included in the "soccer" group, and reference numeral 1412 denotes metadata of the location category included in the "curling" group.

Firstly, in step S1301, the process waits for the user to select a metadata category, which will be used as the criterion of the content arrangement, through the remote controller 103. In this embodiment, it is assumed that the event category is selected. Further, in step S1302, the process waits for the user to select criterion content or criterion metadata, which serves as the starting point in the event category. In this embodiment, it is assumed that "soccer" is selected as the criterion selection metadata.

Next, in step S1303, the content group creating unit 209 groups together the content having the same metadata in the selected category from the metadata (FIG. 7) managed by the content metadata management unit 207. Then, in step S1304, the number of metadata that overlap with those of the selected criterion metadata is counted from the count of overlapping metadata (FIG. 8) created by the content metadata count unit 208.

Subsequently, in step S1305, a metadata category that will be compared with the criterion metadata category is determined based on the category priority order (FIG. 11) stored in the metadata priority order storage unit 214. Here, because the criterion metadata category is the event category, the people metadata category is determined as the category to be compared.

Next, in step S1306, a comparison is made for overlapping metadata in the determined metadata category. Then, in step S1307, it is determined from the result of the comparison whether or not the same total number of overlapping metadata is found in the count table of overlapping metadata with the criterion content shown in FIG. 8. If the same total number is found, the process advances to step S1308, and a metadata category to be compared next is determined. In this embodiment, it is assumed that the location metadata category is selected as a category to be compared based on the category priority order shown in FIG. 11. Then, the process returns to step S1306, where a comparison is made for overlapping metadata in the category determined in step S1308.

If the same total number of overlapping metadata is not found in the count table of the overlapping metadata in step S1307, the process advances to step S1309, and the display order of the content to be arranged is determined. In step S1310, it is determined whether or not there is content to be arranged. If there is content to be arranged, the process returns to step S1305, and the above-described arrangement process is repeated.

If it is determined in step S1310 that there is no content to be arranged, the process advances to step S1311, and the display control unit 212 displays the content on the display unit 224 from the display output unit 213.

In this example, "soccer" is arranged first, followed by "Mr. A, Mr. B, Ms. D and Mr. F" of "fishing", which has a total number of overlapping metadata of four. As for "softball", "traveling" and "curling", which each have a total number of overlapping metadata of three, a comparison is performed for overlapping metadata in the location category which is the next category in the priority order. As a result of the comparison, an arrangement is made in the order of "curling", which has a total number of overlapping metadata of two, "softball", which has a total number of overlapping metadata of one, and "traveling", which has a total number of overlapping metadata of zero. In other words, after "fishing", an arrangement is made in the order of "Mr. A, Mr. B, Ms. D and Mr. E" of "curling", "Mr. B, Ms. D, Mr. F and Mr. E" of "softball", and "Mr. A, Mr. B and Mr. F" of "traveling".

Hereafter, the arrangement process is performed in the same manner on those having a total number of overlapping metadata of two, and those having a total number of overlapping metadata of one. As a result, the content is arranged as shown in FIG. 14. Also, as for the location metadata, the content is arranged as shown in FIG. 14.

In other words, when arranging content according to a given metadata category, the order can be determined in descending order of relevance, and the content can be displayed in that order. Further, the arrangement and display can be performed in consideration of the relevance in each category.

[Arrangement Process 2]

Figure 15:
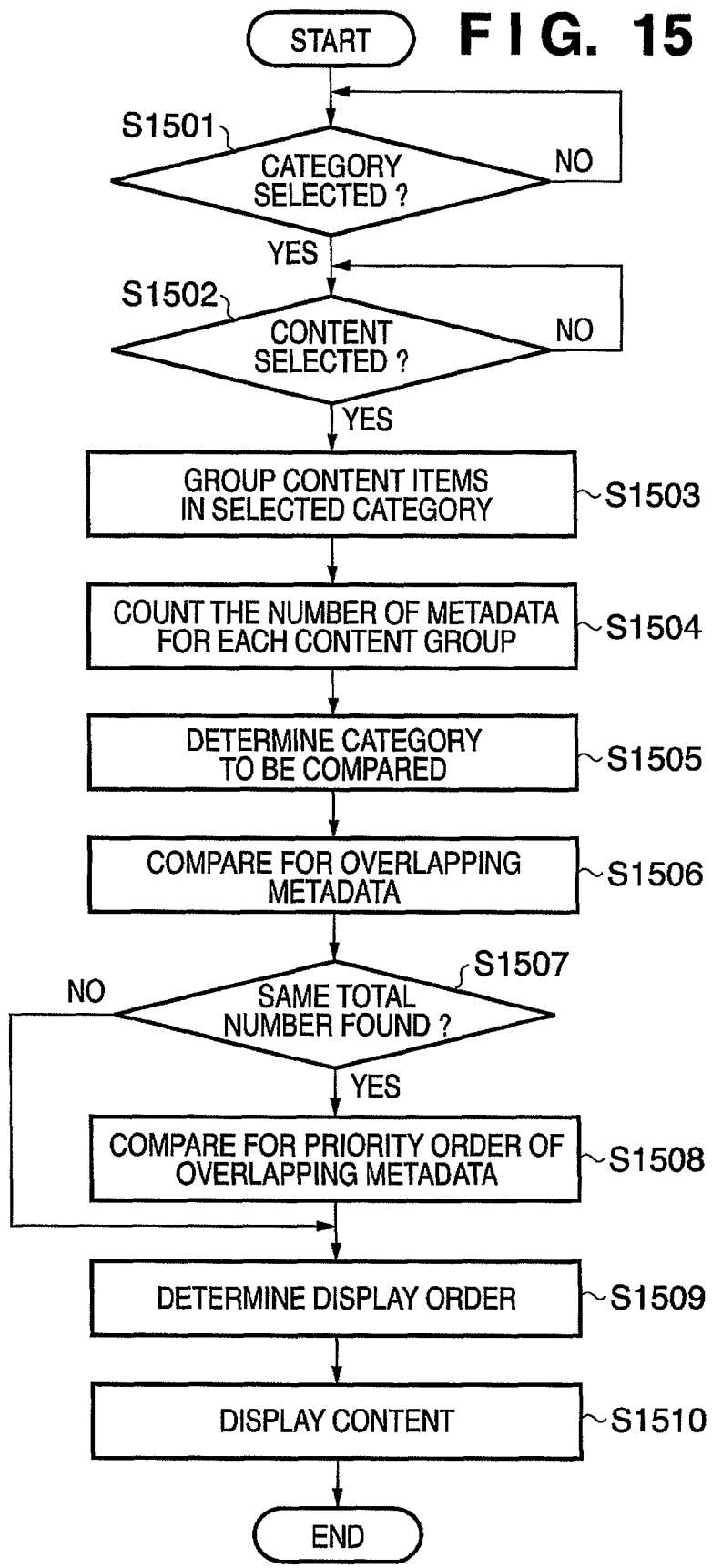
FIG. 15 is a flowchart that shows an arrangement process 2 according to an embodiment of the present invention.

FIG. 15 is a flowchart that shows an arrangement process 2 according to the present embodiment. The arrangement process 2 is performed, when the same total number of overlapping metadata is found in a category, to determine a content arrangement based on the priority order of the overlapping metadata.

Figure 16:
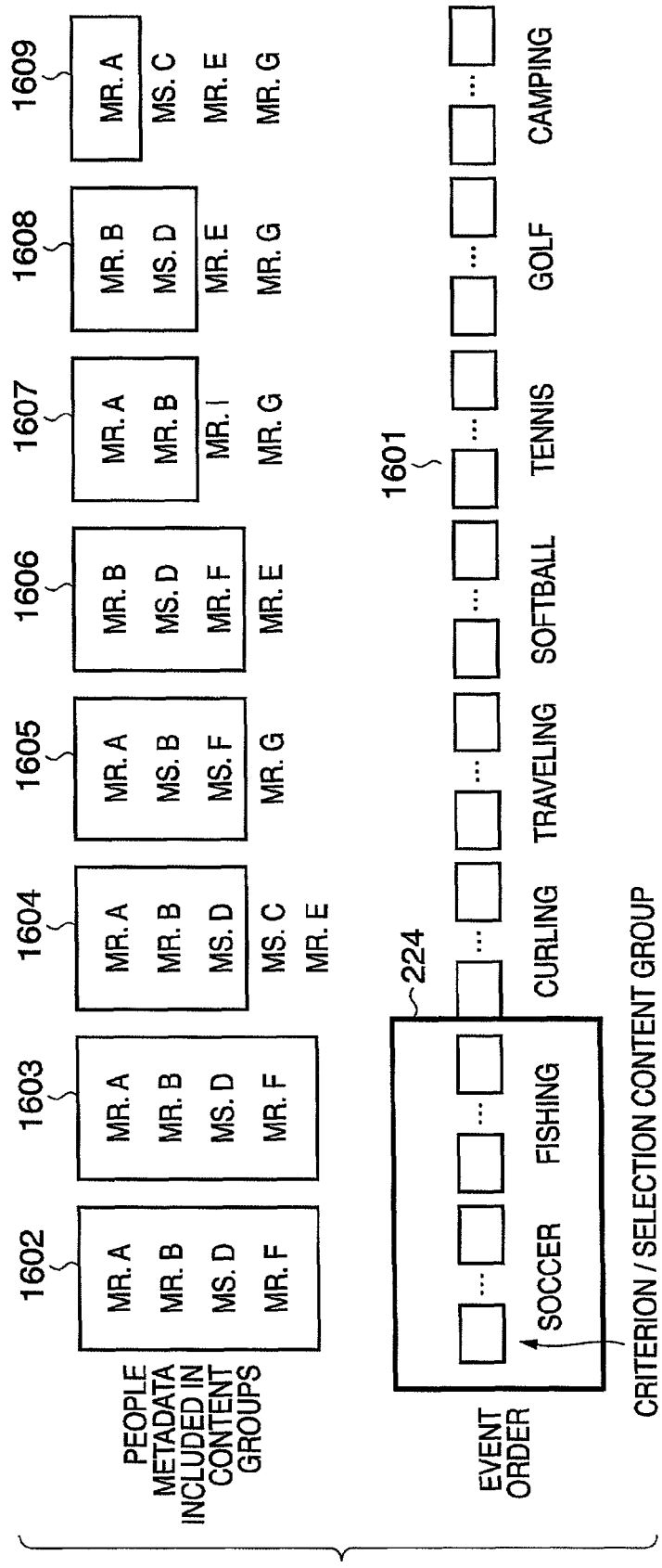
FIG. 16 is a diagram that shows a result of an arrangement process 2 according to an embodiment of the present invention.

FIG. 16 is a diagram that shows a result of the arrangement process 2 according to the present embodiment. In FIG. 16, reference numeral 1601 denotes a content arrangement, and a part thereof is displayed on the display unit 224. Reference numerals 1602 to 1609 denote metadata of the people category included in the content groups of the event category. Reference numeral 1602 denotes metadata of the people category included in the "soccer" group, and reference numeral 1603 denotes metadata of the people category included in the "fishing" group.

Firstly, in step S1501, the process waits for the user to select a metadata category, which will be used as the criterion of the content arrangement, through the remote controller 103. In this embodiment, it is assumed that the event category is selected. Further, in step S1502, the process waits for the user to select criterion content or criterion metadata, which serves as the starting point in the event category. In this embodiment, it is assumed that "soccer" is selected as the criterion selection metadata.

Next, in step S1503, the content group creating unit 209 groups together the content having the same metadata in the selected category from the metadata (FIG. 7) managed by the content metadata management unit 207. Then, in step S1504, the number of metadata that overlap with those of the selected criterion metadata is counted from the count of overlapping metadata (FIG. 8) created by the content metadata count unit 208.

Subsequently, in step S1505, a metadata category that will be compared with the criterion metadata category is determined based on the category priority order (FIG. 11) stored in the metadata priority order storage unit 214. Here, because the criterion metadata category is the event category, the people metadata category is determined as the category to be compared.

Next, in step S1506, a comparison is made for overlapping metadata in the determined metadata category. Then, in step S1507, it is determined from the result of the comparison whether or not the same total number of overlapping metadata is found in the count table of overlapping metadata with the criterion content shown in FIG. 8. If the same total number is found, the process advances to step S1508, and the priority orders of the overlapping metadata are compared based on the priority orders of metadata (FIG. 10) stored in the metadata priority order storage unit 214. Then, in step S1509, the display order is determined based on the priority order. In step S1510, the display control unit 212 displays the content on the display unit 224 from the display output unit 213.

On the other hand, if the same total number of overlapping metadata is not found in the count table of the overlapping metadata in step S1507, the process advances to step S1509, and the display order is determined. Then, in step S1510, the content is displayed.

In this example, "soccer" is arranged first, followed by "Mr. A, Mr. B, Ms. D and Mr. F" of "fishing", which has a total number of overlapping metadata of four. As for "softball", "traveling" and "curling", which have a total number of overlapping metadata of three, an arrangement is made based on the priority order of the overlapping metadata, resulting in the order of "curling", "traveling" and "softball". In other words, a comparison is made among "Mr. A, Mr. B and Ms. D" of "curling", "Mr. B, Ms. D and Mr. F" of "softball", and "Mr. A, Mr. B and Mr. F" of "traveling". As a result, because "curling" and "traveling" include "Mr. A" which is the highest in the priority order, they are arranged first. Then, "curling" including "Ms. D" which is higher in the priority order in the comparison between "Ms. D" and "Mr. F" is arranged first.

Hereafter, the arrangement process is performed in the same manner on those having a total number of overlapping metadata of two, and those having a total number of overlapping metadata of one. As a result, the content is arranged as shown in FIG. 16.

In other words, even when it is determined that the relevance is the same, the display order can be determined. Further, the display order can be determined in consideration of the relevancy between the keywords of the metadata.

[Arrangement Process 3]

Figure 17:
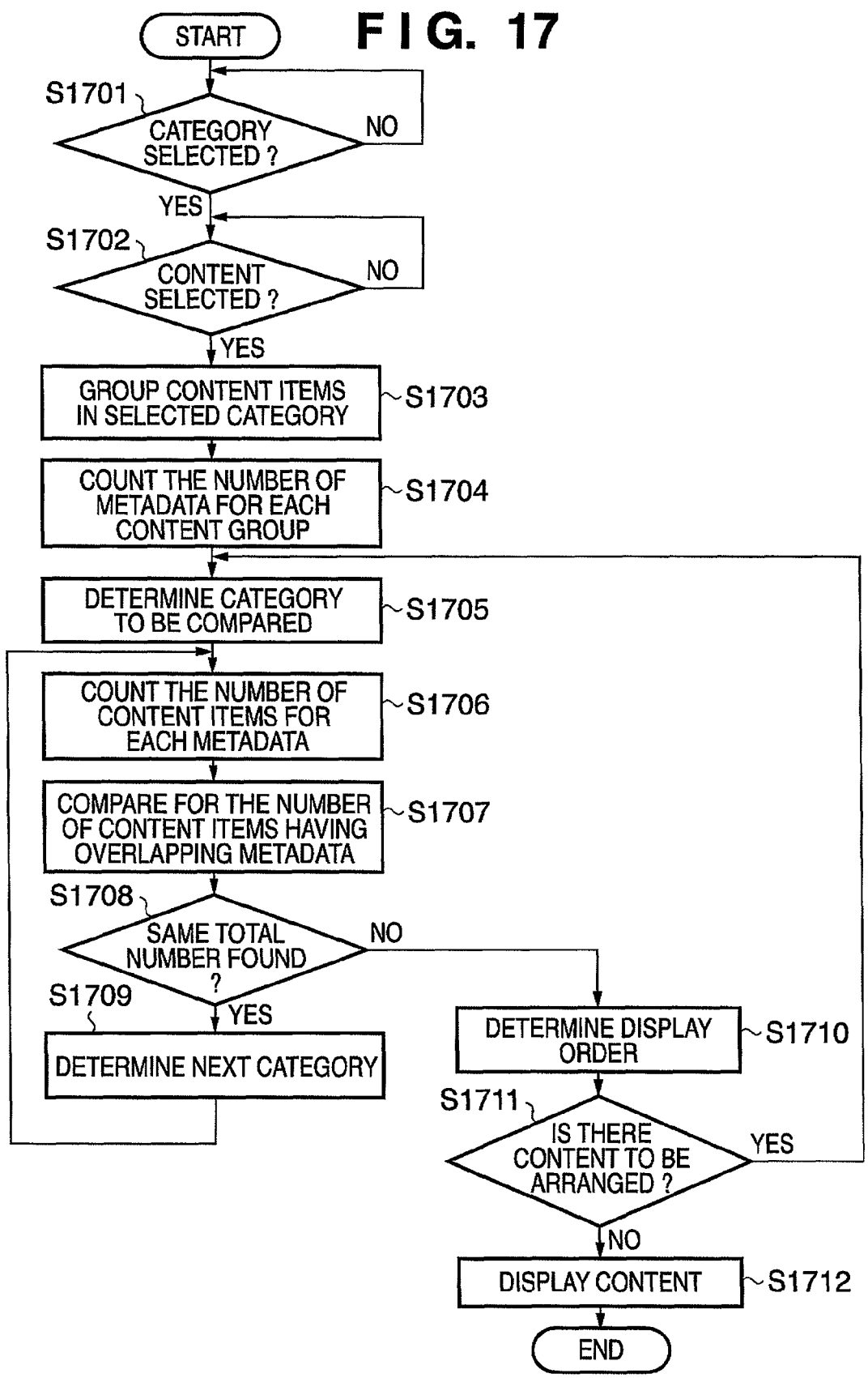
FIG. 17 is a flowchart that shows an arrangement process 3 according to an embodiment of the present invention.

FIG. 17 is a flowchart that shows an arrangement process 3 according to the present embodiment. The arrangement process 3 is performed to determine a content arrangement based on the total number of the content items having overlapping metadata.

Figure 18:
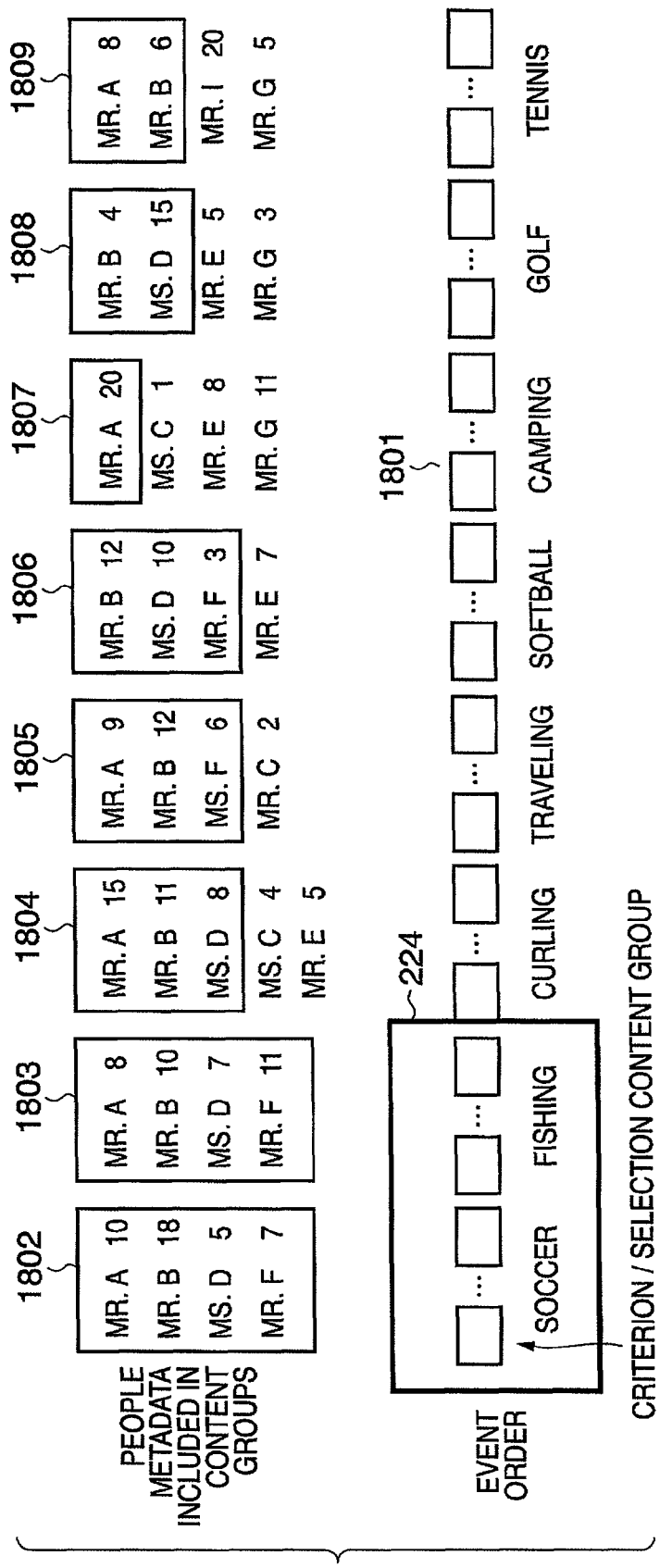
FIG. 18 is a diagram that shows a result of an arrangement process 3 according to an embodiment of the present invention.

FIG. 18 is a diagram that shows a result of the arrangement process 3 according to the present embodiment. In FIG. 18, reference numeral 1801 denotes a content arrangement, and a part thereof is displayed on the display unit 224. Reference numerals 1802 to 1809 denote metadata of the people category and the number of content items having the metadata included in the content groups of the event category. Reference numeral 1802 denotes metadata of the people category included in the "soccer" group, and reference numeral 1803 denotes metadata of the people category included in the "fishing" group.

Firstly, in step S1701, the process waits for the user to select a metadata category, which will be used as the criterion of the content arrangement, through the remote controller 103. In this embodiment, it is assumed that the event category is selected. Further, in step S1702, the process waits for the user to select criterion content or criterion metadata, which serves as the starting point in the event category. In this embodiment, it is assumed that "soccer" is selected as the criterion selection metadata.

Next, in step S1703, the content group creating unit 209 groups together the content having the same metadata in the selected category from the metadata (FIG. 7) managed by the content metadata management unit 207. Then, in step S1704, the number of metadata that overlap with those of the selected criterion metadata is counted from the count of overlapping metadata (FIG. 8) created by the content metadata count unit 208.

Subsequently, in step S1705, a metadata category that will be compared with the criterion metadata category is determined based on the category priority order (FIG. 11) stored in the metadata priority order storage unit 214. Here, because the criterion metadata category is the event category, the people metadata category is determined as the category to be compared.

Next, in step S1706, in each metadata category, the number of content items having each metadata is counted. Then, in step S1707, a comparison is made for the number of content items having overlapping metadata in the metadata category determined in step S1705. In step S1708, it is determined whether or not the same total number of the content items is found. If the same total number is found, the process advances to step S1709, where a metadata category to be compared next is determined. In this embodiment, the location metadata category is determined as the category to be compared from the category priority order shown in FIG. 11. Then, the process returns to step S1707, and a comparison is made for the number of content items having overlapping metadata in the category determined in step S1709.

If it is determined in step S1708 that the same total number of the content items is not found, the process advances to step S1710, and the display order of the content to be arranged is determined. Then, in step S1711, it is determined whether or not there is content to be arranged. If there is content to be arranged, the process returns to step S1705, and the above-described arrangement process is repeated.

On the other hand, if it is determined in step S1711 that there is no content to be arranged, the process advances to step S1712, and the display control unit 212 displays the content on the display unit 224 from the display output unit 213.

In this example, in the case of "fishing", the total number of the content items is 36, which is the total of "Mr. A, Mr. B, Ms. D and Mr. F". In the case of "curling", the total number of the content items is 34, which is the total of "Mr. A, Mr. B and Ms. D". Accordingly, "fishing" and "curling" are arranged in this order after "soccer". Subsequently, as shown in FIG. 18, "traveling", "softball", "camping", "golf", and "tennis" are arranged in this order.

In this example, the same total number of the content items is not found, but if it were found, an arrangement process based on the next higher category in the priority order is performed.

In other words, when arranging content according to a given metadata category, the content can be arranged and displayed in descending order of relevance. Further, the arrangement and display can be performed also in consideration of the relevance in each category.

In the present embodiment, the order of categories to be compared is determined based on the category priority order, but the user also may input the category that includes a content item the user wants to compare next. In this case, it is possible to provide a content arrangement order that is suitable for a condition in which the user performs a visual search.

Also, in the present embodiment, content or metadata serving as the criterion is selected, but it is also possible to set a group including content that is designated when the screen is stopped after being scrolled to move the content display as the criterion content group.

It is also possible to set a group including content located in a criterion position when scrolling is stopped as the criterion content group. For example, in FIG. 6, the content group located at the uppermost position in the screen when the screen is stopped after being scrolled vertically through the operation of the upward and downward direction instruction keys 301 to 302 may be set as the criterion content, and the display order of the content groups located under the uppermost content group is changed automatically. This way, it is possible to display content that is relevant to the content that the user is attempting to view on a single screen, making a visual search easy.

Also, in the present embodiment, the content arrangement is displayed in a single line, but it is also possible to display content in a plurality of lines in accordance with the metadata categories to be compared. Further, it is also possible to display metadata categories to be compared with the criterion content in different directions. For example, as shown in FIG. 19, for the event category metadata, the people category is used as metadata to be compared in the lateral direction, and the location category is used as metadata to be compared in the vertical direction.

Figure 19:
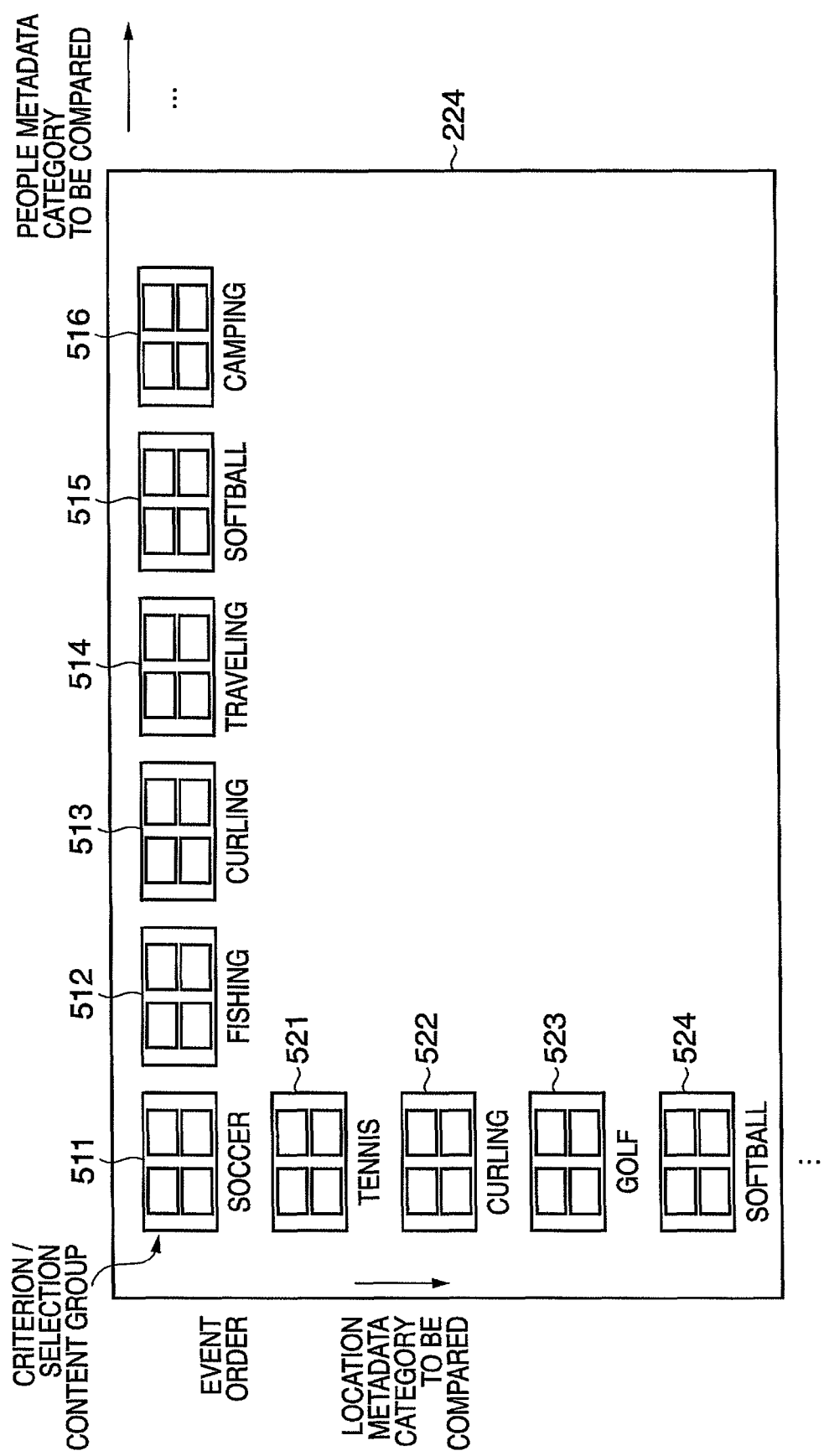
FIG. 19 is a diagram that shows a display example of a content arrangement according to a variation.

In FIG. 19, reference numerals 511 to 516, 521 to 524 denote content group icons grouped by event. For example, when the "soccer" metadata is compared with the people category, "fishing", "curling" and "traveling" are arranged in this order. When compared with the location category, "tennis", "curling" and "golf" are arranged in this order. Then, they are displayed after arranged in the lateral and vertical directions. Here, they are arranged in the lateral and vertical directions, but it is also possible to arrange them in other predetermined directions, such as in oblique directions.

This way, it is possible to display more content that is relevant to the content that the user is attempting to view on a single screen, so that it is possible to accommodate a visual search for various purposes.

According to the embodiment described above, the content groups can be arranged in accordance with the relevance between content items, rather than according to the relevance of the keywords of metadata, in a desired category. It is also possible to obtain an effective content group arrangement relative to the content serving as the criterion.

Also, it is possible to select a desired content group, and thereby change the arrangement of content groups, so that an order that is effective for a visual content search which is to search for certain content while browsing given content can be provided.

Further, by determining the content arrangement order by using metadata of a plurality of categories, content groups can be arranged properly according to the relevance between content items stored in a system.

It should be noted that the present invention may be applied in a system configured of a plurality of devices (for example, a host computer, an interface device, a reader, a printer, etc.), or may be applied in an apparatus configured of a single device (e.g., a copy machine, a facsimile machine, etc.).

In addition, the object of the present invention can also be achieved by supplying a system or an apparatus with a storage medium in which program code that realizes the functionality of the aforementioned embodiment is stored, and a computer (CPU or MPU) of the system or apparatus reading out and executing the program code stored in the storage medium.

In this case, the program code read out from the computer readable storage medium realizes the functionality of the aforementioned embodiment, and the present invention is configured of the program code and the storage medium in which the program code is stored.

Examples of recording media for supplying the program code include flexible disks, hard disks, optical disks, and optomagnetic disks, CD-ROMs, CD-Rs, magnetic tape, non-volatile memory cards, and ROMs.

Moreover, the following case also falls under the scope of the present invention, which is not limited to implementing the functions of the aforementioned embodiment by a computer executing the read-out program code. That is, the case where an operating system (OS) or the like running in a computer performs part or all of the actual processing based on instructions in the program code, and the functionality of the aforementioned embodiment is realized by that processing, is included in the scope of the present invention.

Furthermore, the program code read out from the storage medium may be written into a memory provided in a function expansion board installed in the computer or a function expansion unit connected to the computer. Then, a CPU or the like included in the expansion board or expansion unit performs all or part of the actual processing based on instructions included in the program code, and the functions of the aforementioned embodiment may be implemented through that processing. This also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-122800, filed May 7, 2007, which is hereby incorporated by reference herein in its entirety.

What is claimed is:

1. A content display control method that is executed by a content display control apparatus that arranges and displays a plurality of images taking a given category as a criterion, the method comprising:

grouping the plurality of images into respective content groups, each content group having one or more images which share a common item of metadata in a previously selected first category;

determining a sorting order of content groups grouped by the first category in the grouping step, using one of the content groups as a criterion; and displaying the content groups on a display apparatus according to the sorting order determined in the determining step, wherein the determining step comprises counting the number of items of metadata of a second category, which overlaps between the content group serving as the criterion and the content groups to be sorted, and wherein the sorting order of the content groups is determined such that the larger the number of items counted for a particular content group, the closer the particular content group is to the content group serving as the criterion.

2. The method according to claim 1, wherein the second category is determined in accordance with a previously set priority order relative to the first category.

3. The method according to claim 2, wherein when the count result is the same between the other content groups, the sorting order of the content groups is determined based on a count result of a third category that is determined in accordance with the previously set priority order.

4. The method according to claim 1, wherein when the count result is the same between the other content groups, the sorting order of the content groups is determined based on a previously set priority order of the metadata.

5. The method according to claim 1, wherein in the determining step, the number of images that belong to each of the other content groups having images with metadata of the second category is counted for each content group, and the sorting order of the content groups is determined based on the count result.

6. The method according to claim 5, wherein when the count result is the same between the other content groups, the sorting order of the content groups is determined based on a count result of a third category that is determined in accordance with a previously set priority order.

7. The method according to claim 1, wherein in the displaying step, the plurality of images for each content group is displayed in order in an arbitrary direction, according to the determined sorting order.

8. A non-transitory computer readable recording medium that retrievably records a computer-executable program that causes a computer to execute the content display control method according to claim 1.

9. A content display control apparatus that arranges and displays a plurality of images taking a given category as a criterion, the apparatus comprising:

a grouping unit configured to group the plurality of images into respective content groups, each content group having one or more images which share a common item of metadata in a previously selected first category;

a determination unit configured to determine a sorting order of content groups grouped by the first category in the grouping unit, using one of the content groups as a criterion; and a display unit configured to display the content groups on a display apparatus according to the sorting order determined by the determination unit, wherein the determination unit counts the number of items of metadata of a second category, which overlaps between the content group serving as the criterion and the content groups to be sorted, and wherein the sorting order of the content groups is determined such that the larger the number of items counted for a particular content group, the closer the particular content group is to the content group serving as the criterion.

* * * * *